United States Patent
Michel et al.

(10) Patent No.: US 9,731,585 B1
(45) Date of Patent: Aug. 15, 2017

(54) QUICK RELEASE ASSEMBLY FOR ELECTRIC SIDE ROLL TARPS

(71) Applicant: Michel's Industries Ltd., St. Gregor (CA)

(72) Inventors: Bud Michel, St. Gregor (CA); Steven Koenders, St. Gregor (CA)

(73) Assignee: Michel's Industries Ltd., St. Gregor, SK (CA)

( * ) Notice: Subject to any disclaimer, the term of this patent is extended or adjusted under 35 U.S.C. 154(b) by 0 days.

(21) Appl. No.: 15/045,785

(22) Filed: Feb. 17, 2016

(51) Int. Cl.
*F16B 7/04* (2006.01)
*F16B 21/12* (2006.01)
*B60J 7/10* (2006.01)
*F16B 13/04* (2006.01)

(52) U.S. Cl.
CPC ............... *B60J 7/104* (2013.01); *F16B 7/042* (2013.01); *F16B 13/04* (2013.01); *F16B 21/12* (2013.01); *Y10T 403/7083* (2015.01)

(58) Field of Classification Search
CPC ... B60J 7/067; B60J 7/068; B60J 7/085; B60J 7/104; B60P 7/04; F16B 7/042; F16B 7/105; F16B 13/04; F16B 17/00; F16B 19/02; F16B 21/12; F16B 2021/14; Y10T 403/5741; Y10T 403/59; Y10T 403/598; Y10T 403/7047; Y10T 403/7079; Y10T 403/7083; Y10T 403/7088; Y10T 403/7182; Y10T 403/7188

USPC ............ 403/306, 321, 324, 365, 378, 379.2, 403/379.5, 398, 399, DIG. 4; 464/182, 464/901
See application file for complete search history.

(56) References Cited

U.S. PATENT DOCUMENTS

| | | | |
|---|---|---|---|
| 9,272,610 B2 * | 3/2016 | Schmeichel | ............ B60J 7/085 |
| 9,415,667 B2 * | 8/2016 | Smith | ............ B60J 7/085 |
| 2013/0313855 A1 | 11/2013 | Schmeichel | |

* cited by examiner

*Primary Examiner* — Josh Skroupa
(74) *Attorney, Agent, or Firm* — Gowling WLG (Canada) LLP

(57) ABSTRACT

A quick release assembly for a side roll tarp has a roll-tube coupler connected to a roll-tube for rolling and unrolling the side roll tarp. A drive coupler is connected to a shaft of a motor, the drive coupler fitting within an opening in the roll-tube coupler. The drive coupler has a first groove and second groove circumferentially around an exterior of a circular shaft below a head portion of the driver coupler. A quick release pin traverses through a pair of tangential openings in the body of the roll-tube coupler to engage the first or second grooves of the drive coupler, wherein the driver coupler is engaged with the roll-tube coupler when in the first groove allowing the motor to drive the roll-tube and disengaged from the roll-tube coupler when in the second groove allowing the roll-tube to be rotated independently of the motor.

15 Claims, 7 Drawing Sheets

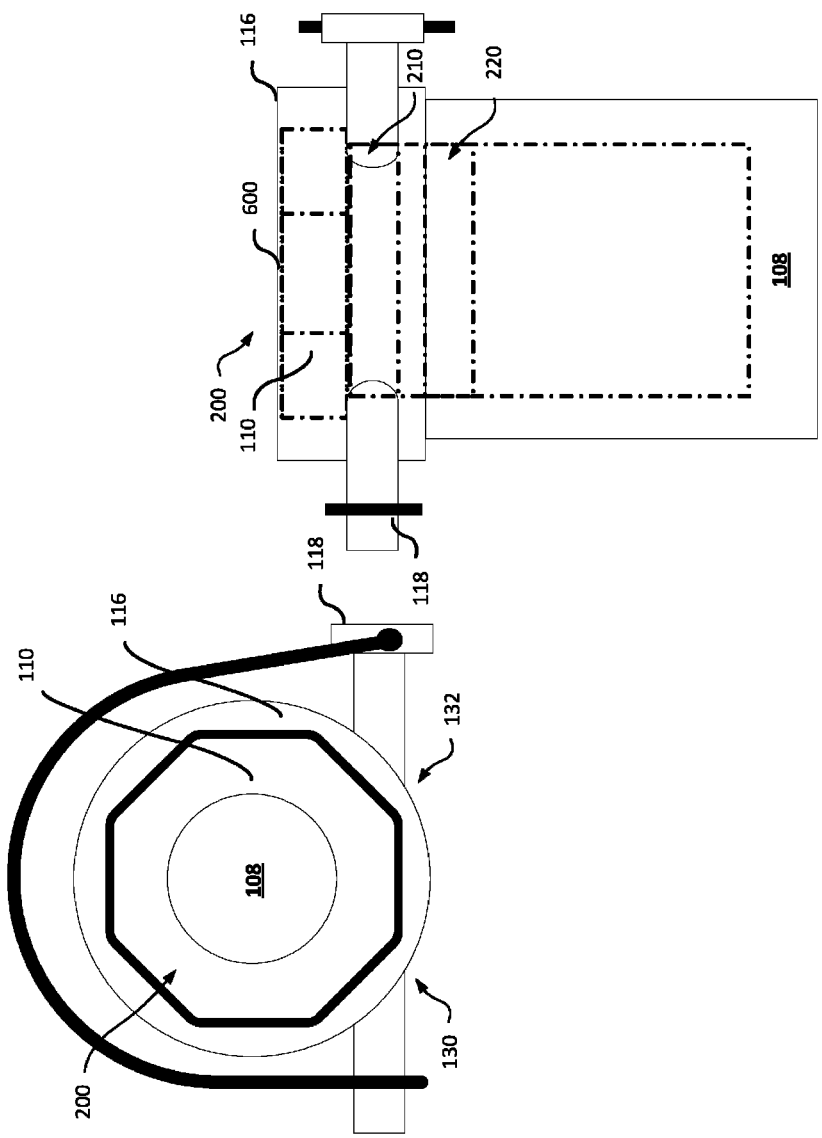

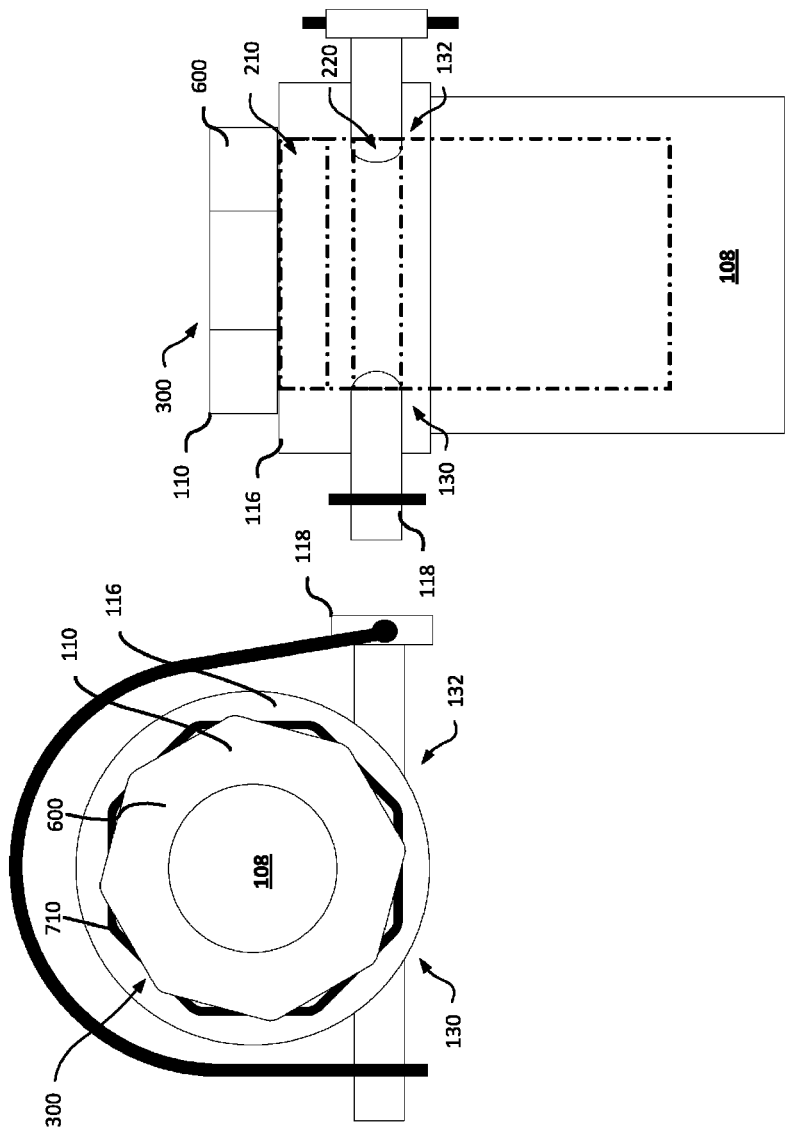

QUICK RELEASE ASSEMBLY FOR ELECTRIC SIDE ROLL TARPS

TECHNICAL FIELD

The present disclosure relates to side roll tarps for truck cargo and in particular to electric side roll tarps.

BACKGROUND

Cargo boxes or truck trailers can have a side roll tarp cover to protect the load contained therein. The tarp cover assembly may be motorized to facilitate rolling an unrolling of the tarp. An electric or motorized side roll mechanism may be utilized to increase the ease of operation of the tarp. However, if the motor fails, manual operation is required to roll and un-roll the tarp. If the motor is engage manual operation is not possible, therefore the motor must be disengaged from the tarp enable operation by a hand crank.

Accordingly, an assembly that enables improved disengagement of a motor from a side roll tarp to facilitate manual operation remains highly desirable.

BRIEF DESCRIPTION OF THE DRAWINGS

Further features and advantages of the present disclosure will become apparent from the following detailed description, taken in combination with the appended drawings, in which:

FIGS. 6A & 6B shows a top and side view of a quick release assembly in an engaged position; and FIGS. 7A & 7B shows a top and side view of a quick release assembly in a disengaged position.

It will be noted that throughout the appended drawings, like features are identified by like reference numerals.

DETAILED DESCRIPTION

In accordance with an aspect of the present disclosure there is provided a quick release assembly for a side roll tarp, the assembly comprising: a roll-tube coupler is connects to a roll-tube for rolling and unrolling the side roll tarp; and a drive coupler connected to a shaft of a motor, the drive coupler fitting within an opening in the roll-tube coupler, the drive coupler having a first groove and second groove circumferentially around an exterior of a circular shaft below a head portion of the drive coupler, wherein a quick release pin traverses through a pair of openings tangential to a rotational axis in a body of the roll-tube coupler to engage the first or second grooves of the drive coupler, wherein the drive coupler is: engaged with the roll-tube coupler when the quick release pin is in the first groove allowing the motor to drive the roll-tube; and disengaged from the roll-tube coupler when the quick release pin is in the second groove allowing the roll-tube to be rotated independently of the motor.

Embodiments are described below, by way of example only, with reference to FIGS. 1 to 7. A new quick release assembly for electric side roll tarps is disclosed. Side roll tarps are utilized for truck cargo boxes or trailers and can be manually or electrically motorized. When the side roll tarp assembly is motorized if there is a motor failure the motor must be disengaged from the side roll assembly to enable manual operation. The quick release assembly provides a backup if there is a motor failure. The operator can pull a pin and pull back this assembly and re-insert the pin in a "free wheel" position so the operator can manually operate the tarp with a crank on the opposite end of the roller.

Figure 1:
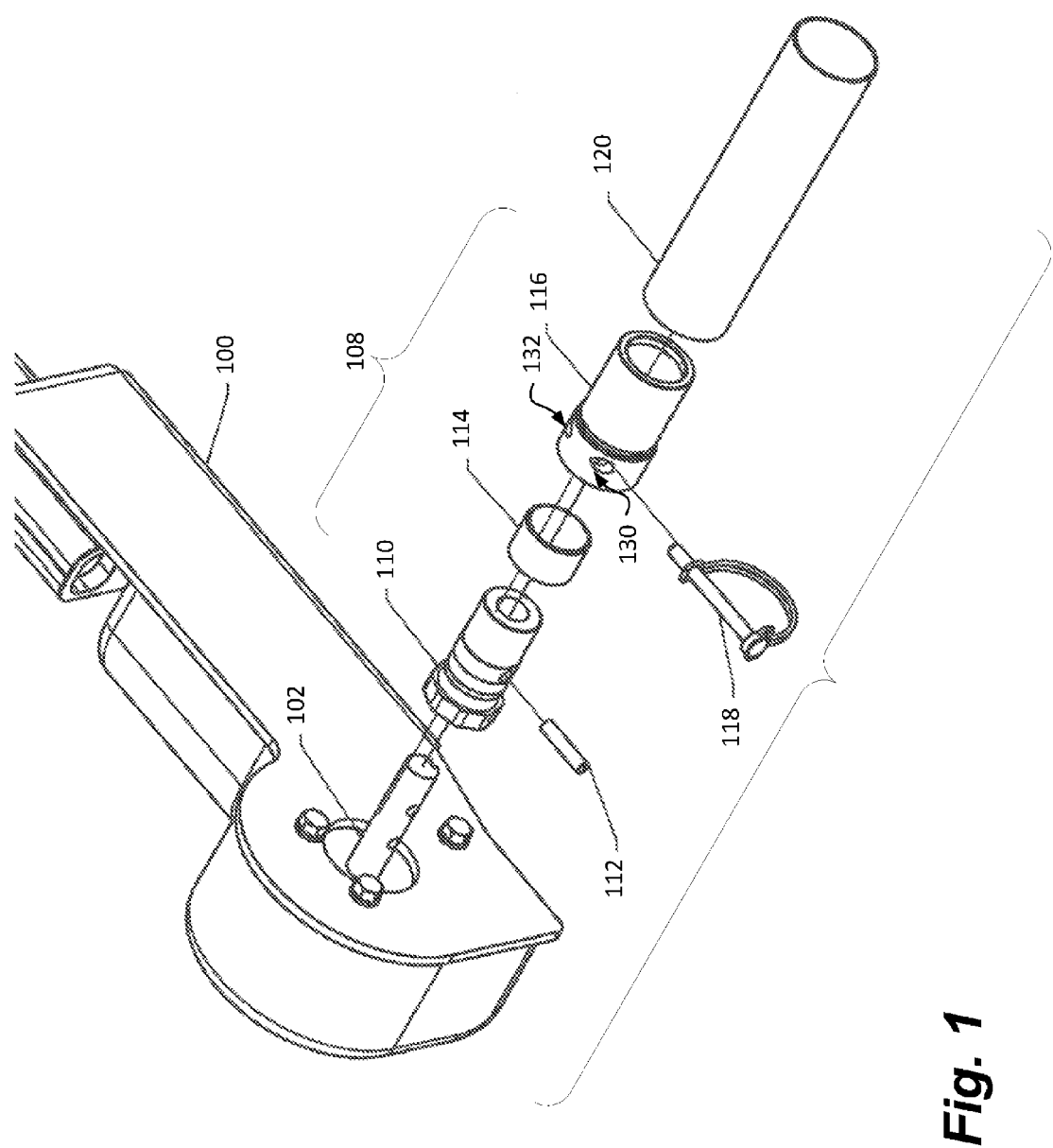
FIG. 1 shows an expanded view of a quick release assembly.

FIG. 1 shows an expanded view of a quick release assembly 108. The quick release assembly 108 couples the shaft 102 of motor 100 to roll-tube 120. The quick release assembly 108 has a drive coupler 110 which connects to the shaft 102. The drive coupler 110 is retained to the shaft 102 by a drive roll pin 112 which passes through an opening through the axis of the shaft 102 and the drive coupler 110. A bushing 114 encircles the lower outside bottom portion of the drive coupler 110 to position the drive coupler 110 within the roll-tube coupler 116 and enables smooth rotation. The roll-tube coupler 116 is secured to the drive coupler 110 by a quick release pin 118 or clevis pin at the top portion of the roll-tube coupler 116. In an embodiment the quick release pin 118 has a rigid member for passing through the body of the driver coupler and a flexible external member for retaining the quick release pin 118 in place. Other types of retaining pins may be utilized for example having an internal spring bias mechanism, or a retaining clip or ring at one end of the pin. The roll-tube coupler 116 has two openings or holes 130 and 132 which are tangential to an axis of the roll-tube coupler 116. The quick release pin 118 can be secured through the opening 130 and opening 132 and transit through a groove in the drive coupler 110 to secure the roll-tube coupler 116 to the drive coupler 110 in an engaged or disengaged position which will be discussed below. A roll-tube 120 for rolling or unrolling the tarp covers the bottom portion of the roll-tube coupler 116 and may be secured by a friction fit or by physical connection or retention method. The circular shaft 102 fits within a circular opening of the body of the drive coupler 110 defining the rotational axis of the shaft 102. The drive coupler which fits into a circular opening of the body of the roll-tube coupler 116 along the rotational axis, which connects to the roll-tube 120 which aligns along the axis of the drive shaft 102.

Figure 2:
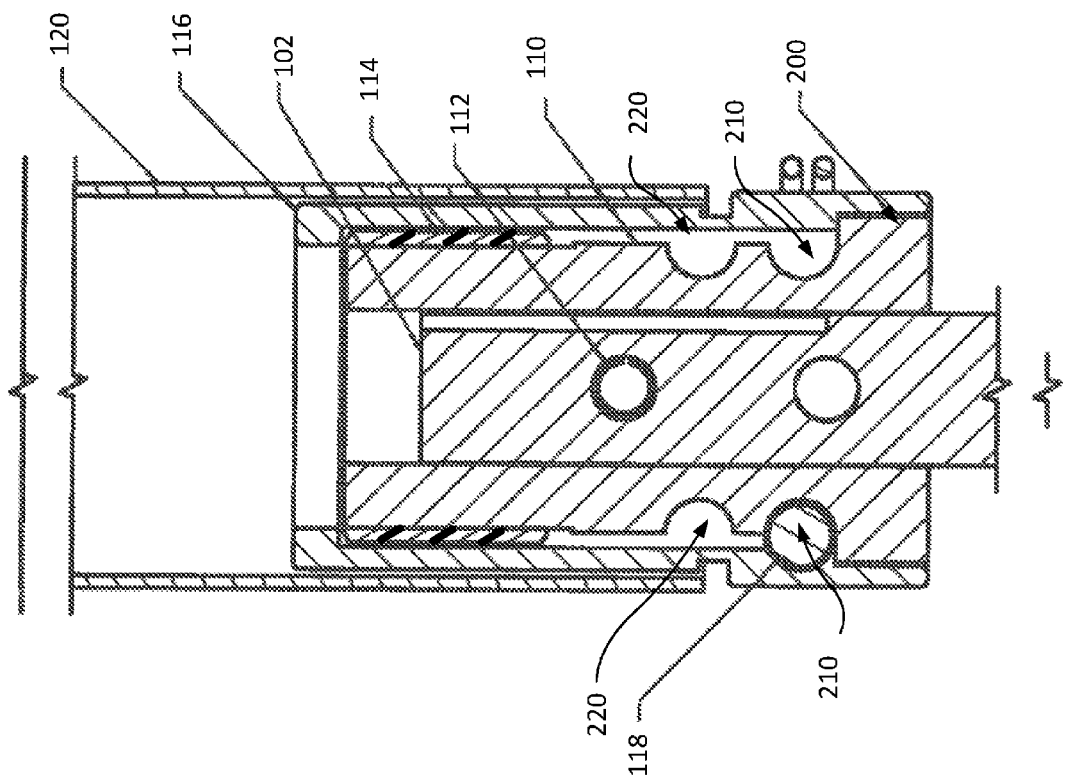
FIG. 2 shows a cross-section view of a quick release coupler in an engaged position.
Figure 4:
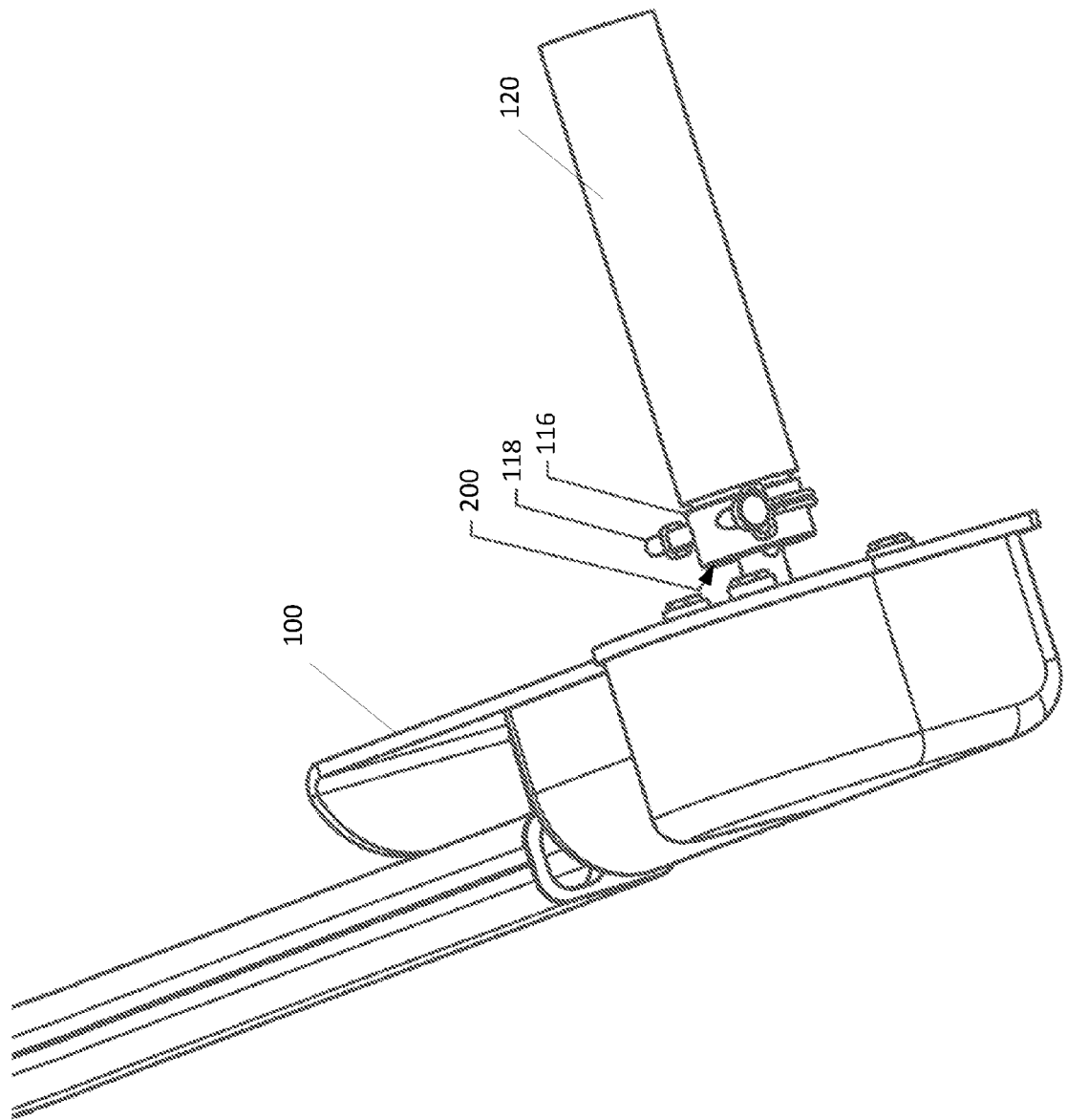
FIG. 4 shows a perspective view of a quick release assembly in an engaged position.

FIG. 2 shows a cross-section view of a quick release assembly 108 in an engaged position. When the drive coupler 110 is engaged 200 with the roll-tube coupler 116, the drive shaft 102 can rotate the roll-tube 120. In the engaged position the quick release pin 118 is positioned through opening 130 and opening 132 which aligns with a first groove 210 on the outer circumference of the driver coupler 110. The top portion of the drive coupler 110 engages the top portion of the roll-tube coupler 116 and enables transfer of torque from the drive shaft 102, through drive coupler 110 and roll-tube coupler 116 to roll-tube 102. As shown in FIG. 4 the drive coupler 110 is positioned within the roll-tube coupler when engaged 200.

Figure 3:
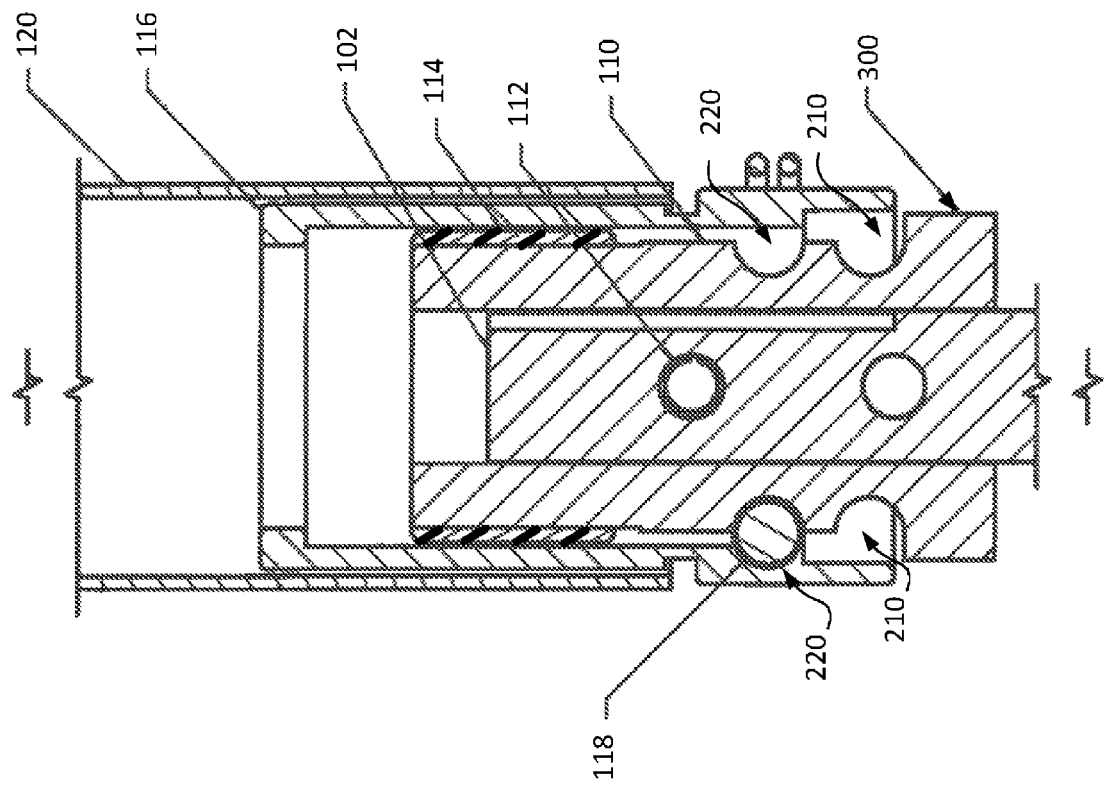
FIG. 3 shows a cross-section view of a quick release coupler in a disengaged position.
Figure 5:
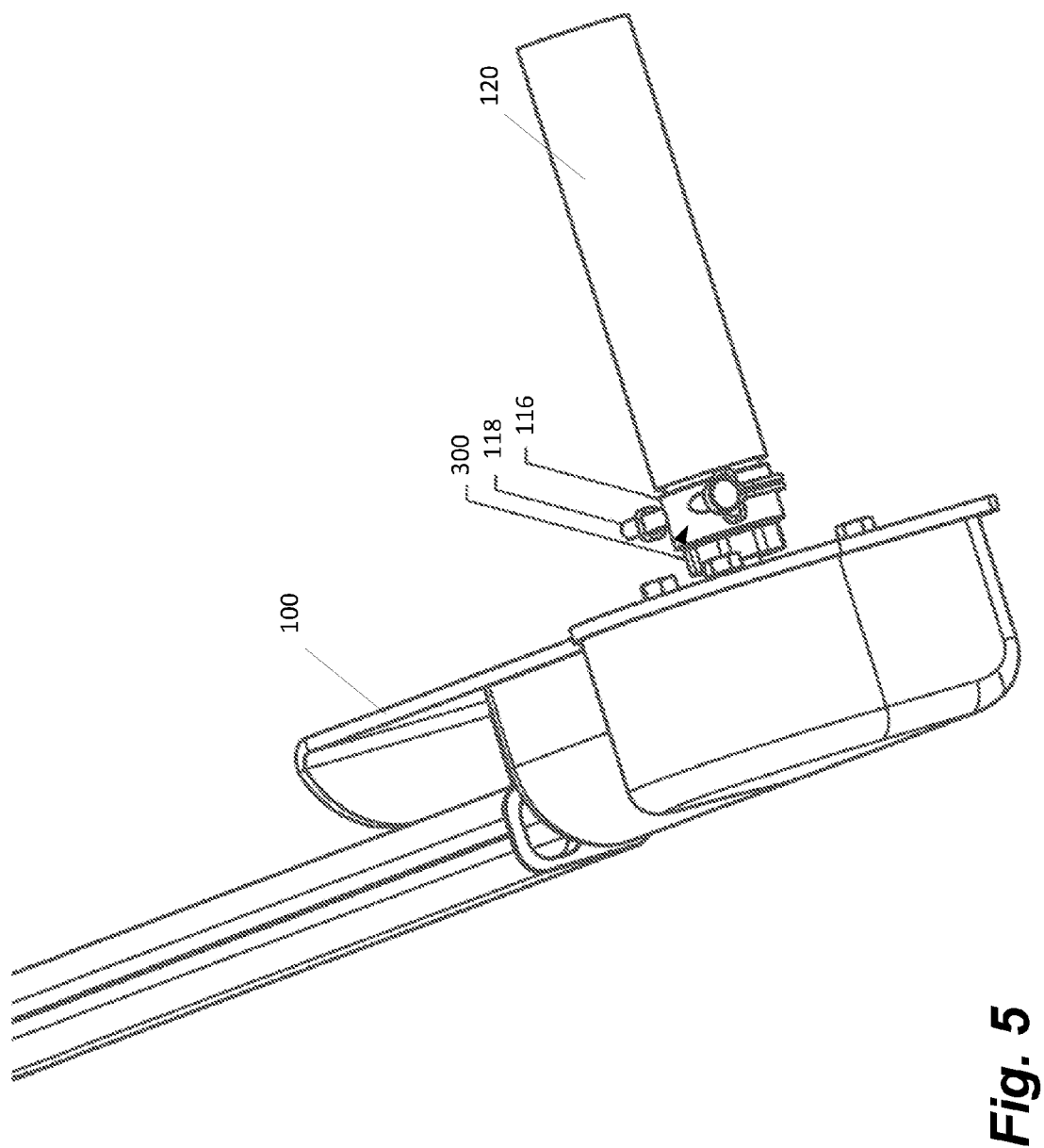
FIG. 5 shows a perspective view of a quick release assembly in a disengaged position.

Referring to FIG. 3, the quick release assembly 108 is shown in a disengaged position. The roll-tube 120 can be disengaged from the shaft 102 by removing the quick release pin 118 from first groove 210 and movement of the roll-tube coupler 116 to align with a second groove 220. The quick release pin 118 can then be re-inserted however the top portion of the drive coupler 110 is disengaged 300 from the roll-tube coupler 116 as shown in FIG. 5. Therefore the roll-tube 120 can be manually rotated at the opposite end when disengaged from the motor 100.

FIGS. 6A and 6B shows a top and side view of a quick release assembly in an engaged position 200. When the drive coupler 110 is engaged with the roll-tube coupler 116, the driver coupler 110 is recessed within the top portion or head 600 of the roll-tube coupler 116. The top portion of the driver coupler 116 fits within a octagon opening of the roll-tube 120. Although an octagon shape is shown other shapes may be utilized such as but not limited to hexagon, squares, triangles, rectangles or combination therein. When the drive coupler 110 is engaged with the roll-tube coupler 116 the quick release pin 118 passes through the first groove 210 on the periphery of the driver coupler 110. With the quick release pin 118 in place, rotation of the drive coupler 110 by the motor 100 will rotate the roll-tube 120. Although the drive coupler 110 and roll tube coupler 116 may be flush at the top end when engaged or the drive couple may alternatively extend above the top end when engaged.

FIGS. 7A and 7B shows a top and side view of a quick release assembly in a disengaged position 300. In the disengaged position 300, the quick release pin 118 maintains the position of the driver coupler 110 by passing through the second groove 220. The head 600 of the drive coupler 110 is positioned above or disengaged from the roll-tube coupler 116 opening 710. The roll-tube 120 can therefore move independently of the motor 100 as shown in FIG. 7a but the position of the roll-tube 120 is maintained in alignment with the motor 100 shaft 112. Components of the quick release mechanism may be made of metal, steel, stainless steel, aluminum or composite material able to transfer and withstand torque transfer from the motor 100 to tarp roll-tube 120.

Although a quick release assembly for a side roll tarp application is disclosed, the mechanism may be utilized in other rolling tarp or chute applications where disengagement from the motor is required for manual operation but alignment is maintained.

It would be appreciated by one of ordinary skill in the art that the system and components shown in FIGS. 1-7 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A quick release assembly for a side roll tarp, the assembly comprising:
   a roll-tube coupler is connected to a roll-tube for rolling and unrolling the side roll tarp; and
   a drive coupler connected to a shaft of a motor, the drive coupler fitting within an opening in the roll-tube coupler, the drive coupler having a first groove and second groove circumferentially around an exterior of a circular shaft below a head portion of the drive coupler,
   wherein a quick release pin traverses through a pair of openings tangential to a rotational axis in a body of the roll-tube coupler to engage the first or second grooves of the drive coupler, wherein the drive coupler is:
      engaged with the roll-tube coupler when the quick release pin is in the first groove allowing the motor to drive the roll-tube; and
      disengaged from the roll-tube coupler when the quick release pin is in the second groove allowing the roll-tube to be rotated independently of the motor.

2. The quick release assembly of claim 1 wherein the first groove is positioned below the head portion of the drive coupler and above the second groove along the axis of the body of the drive coupler.

3. The quick release assembly of claim 1 wherein the drive coupler is secured to the shaft of the motor by a drive roll pin passing through an opening a body of the drive coupler into an opening of the drive motor shaft.

4. The quick release assembly of claim 1 wherein the quick release pin is positioned tangentially to an axis of the drive coupler and the roll-tube coupler.

5. The quick release assembly of claim 1 further comprising a bushing that encircles a lower outside bottom portion of the drive coupler to position the drive coupler within the roll-tube coupler.

6. The quick release assembly of claim 5 wherein the bushing is a plastic material.

7. The quick release assembly of claim 1 where in the roll-tube encircles the outside of the roll-tube coupler.

8. The quick release assembly of claim 1 wherein the roll tube coupler has an opening at a top portion for receiving the head portion of the drive coupled when engaged.

9. The quick release assembly of claim 8 wherein the head portion of the drive coupler is an octagon shape.

10. The quick release assembly of claim 9 wherein the opening in the roll-tube coupler is an octagon shape and is slightly larger than the drive coupler.

11. The quick release assembly of claim 8 wherein the head portion of the drive coupler is positioned outside of the roll-tube coupler when disengaged.

12. The quick release assembly of claim 1 wherein the drive coupler has a circular opening extending along a rotational axis of the drive coupler for receiving the shaft of the motor.

13. The quick release assembly of claim 1 wherein an outer profile of the drive coupler is circular.

14. The quick release assembly of claim 1 wherein the drive coupler and roll tube coupler have a substantially circular profile.

15. The quick release assembly of claim 1 wherein the head portion of the drive coupler drives the roll-tube coupler when engaged.

\* \* \* \* \*